United States Patent [19]
Sutton

[11] 4,094,283
[45] June 13, 1978

[54] INTERNAL COMBUSTION ENGINE

[75] Inventor: Douglas Leslie Sutton, Solihull, England

[73] Assignee: British Leyland UK Limited, London, England

[21] Appl. No.: 716,208

[22] Filed: Aug. 20, 1976

[30] Foreign Application Priority Data

Aug. 19, 1975 United Kingdom ............... 34360/75

[51] Int. Cl.² ............................................ F02M 25/06
[52] U.S. Cl. ........................... 123/119 A; 123/52 MV; 123/59 PC
[58] Field of Search .......... 123/59 PC, 52 MV, 52 M, 123/119 A

[56] References Cited

U.S. PATENT DOCUMENTS

| | | | |
|---|---|---|---|
| 3,868,934 | 3/1975 | Mick | 123/119 A |
| 3,903,859 | 9/1975 | Aquino et al. | 123/119 A |
| 3,915,128 | 10/1975 | Rich | 123/52 MV |
| 3,937,196 | 2/1976 | Cook et al. | 123/119 A |

Primary Examiner—Wendell E. Burns
Attorney, Agent, or Firm—Brisebois & Kruger

[57] ABSTRACT

Two or more carburetors for an internal combustion engine are mounted on a member providing inlet ducts for each carburetor to engine. The member also includes: An engine coolant duct to heat the ducts; and, further an exhaust gas duct to provide rapid heat-up of the inlet ducts on cold starting. A recirculating exhaust gas valve can also be used.

5 Claims, 5 Drawing Figures

INTERNAL COMBUSTION ENGINE

This invention relates to an internal combustion engine. It is concerned in particular with an engine having a plurality of carburetters mounted on the engine by a common structural member.

According to the present invention in an internal combustion engine incorporating a plurality of carburetters mounted on the engine by way of a common structural member having a first duct to allow the passage of fuel/air mixture from a carburetter to the engine and a second duct for water or other liquid through the member there is provided the improvement comprising the provision of a third duct in the member in the vicinity of, and defining a path in heat exchange relationship with, the first duct; a pipe linking the third duct upstream of the heat exchange path to an exhaust manifold of the engine; and a passage downstream of the heat exchange path linking the third duct to the first.

An embodiment of the invention will now be described with reference to the accompanying drawings of part of a V-8 internal combustion engine of which:

FIG. 1 shows an inlet manifold 11 with inclined faces 12, 13 for mounting on an engine block (not shown) having two inclined banks of cylinders each containing four cylinders.

Figure 1:
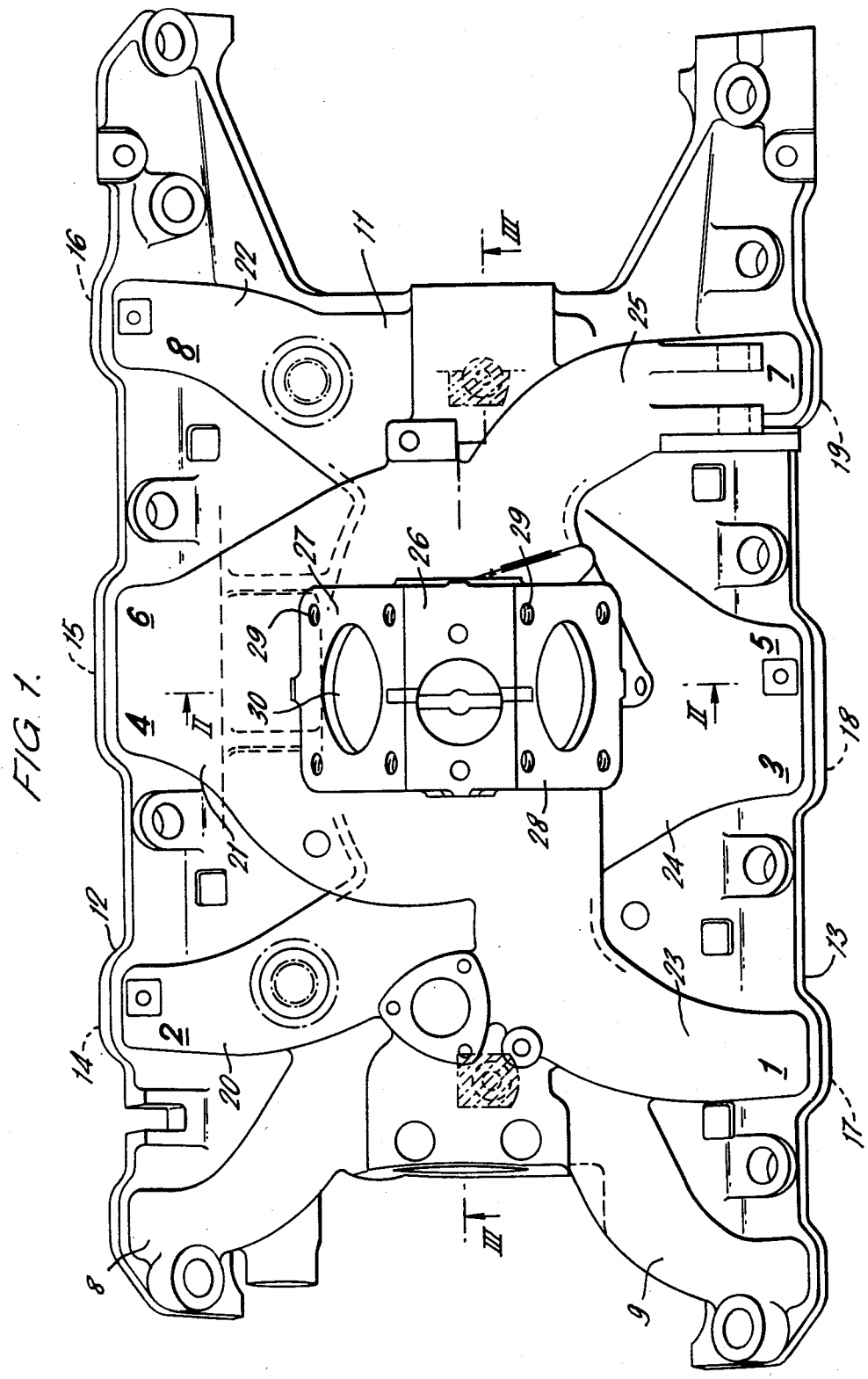
FIG. 1 is a plan view of an inlet manifold.

As face 13 is similar to face 12 reference is now made to face 12 with the corresponding items relating to face 13 added in parenthesis. Face 12 (13) contains three inlet ports 14, 15, 16 (17, 18, 19) which are fed, respectively, by tracts 20, 21, 22 (23, 24, 25). Ports 14 and 16 (17 and 19) feed cylinders numbered 2 and 8 (1 and 7). Port 15 (24) is siamesed to feed cylinders 4 and 6 (3 and 5). The cylinder number is cast into its corresponding tract as shown.

Figure 2:
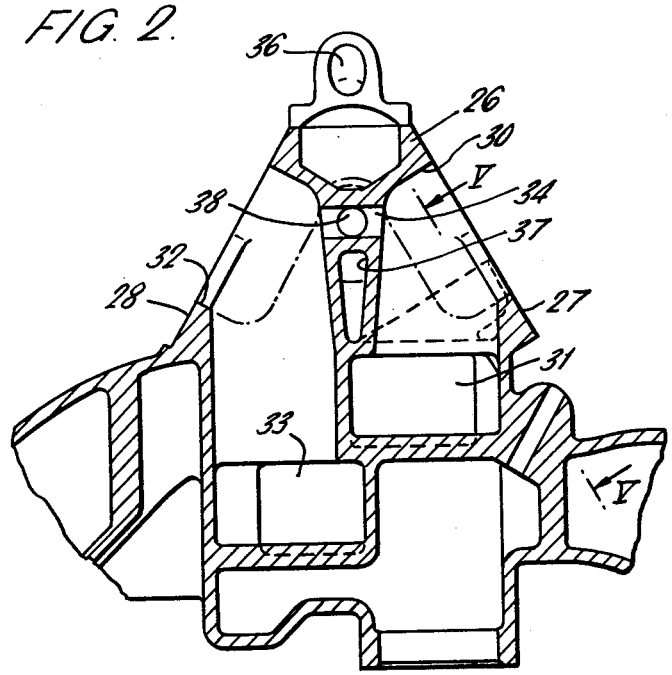
FIG. 2 is a vertical section on II—II of FIG. 1 with an added component.
Figure 4:
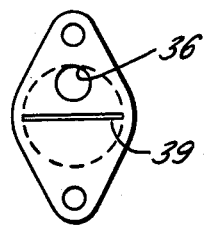
FIG. 4 is a horizontal section on Iv—IV of FIG. 3.
Figure 3:
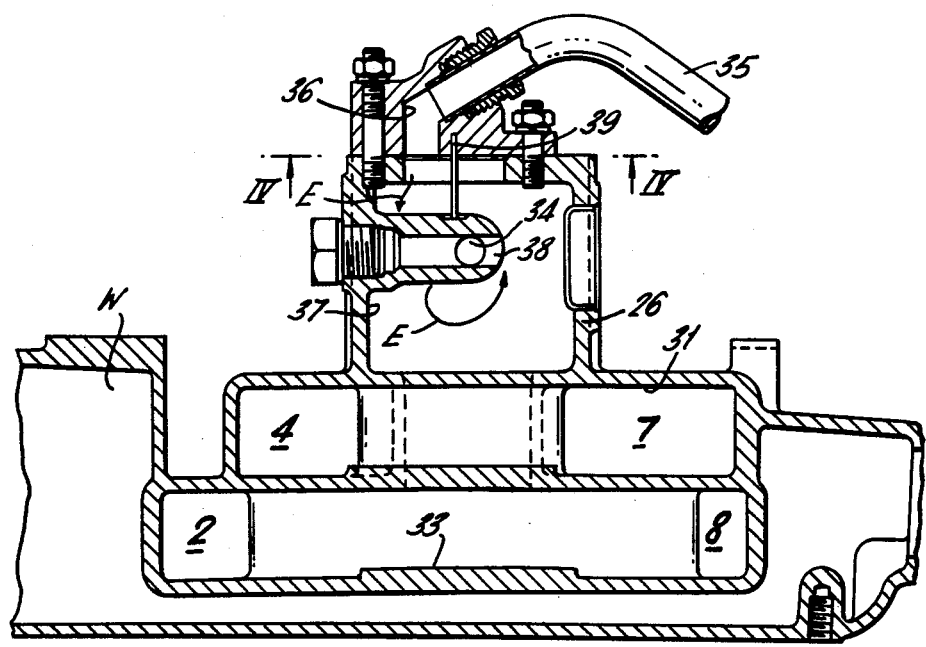
FIG. 3 is a vertical section on III—III of FIG. 1 with added components.

Manifold 11 has a centrally disposed penthouse 26 (shown in FIGS. 2 and 3). The penthouse 26 has inclined faces 27, 28 on each of which are mounted an SU (RTM) carburetter (not shown) by way of bolt holes 29.

The face 27 has extending through it a passage 30 which feeds into an upper plenum chamber 31 which communicates with tract 23, 21 and 25. The face 28 has extending through it a passage 32 which feeds into a lower plenum chamber 33 which communicates with tracts 20, 24, 22.

In this way a given carburetter acts to feed two cylinders in each of the two banks rather than four cylinders in one bank. To provide for equal pressure balance between passages 30 and 32 a balancing duct 34 extends between the passages.

FIG. 3 shows water channel W through which coolant water is pumped around the manifold 11. The manifold is coupled into the engine coolant circuit by way of pipes 8, 9 (FIG. 1).

Exhaust gases are recirculated, as will be hereinafter described, to the penthouse 26 along line 35 (FIG. 3) and duct 36 to jacketing enclosures surrounding passages 30 and 32.

Figure 5:
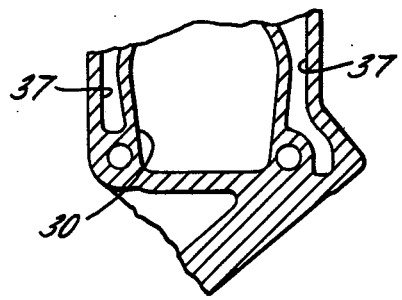
FIG. 5 is a partial view on section V—V of FIG. 2.

Passage 30 is shown, in FIGS. 3 and 5, with jacketing enclosure 37. The enclosure is fed at its upstream end by duct 36.

Exhaust gas leaves the enclosure 37, at its downstream end by way of outlet 38 which opens into balancing duct 34. The enclosure for passage 32 similarly empties into balancing duct 34.

To prevent the passage of exhaust gas from duct 36 to outlet 38 without sufficient delay in the enclosure 37 baffle 39 is provided. The baffle 39 is disposed in the most direct route between duct 36 and outlet 38. In this way exhaust gas is construed to follow a path generally indicated by arrow E.

An exhaust gas recirculation valve at the upstream end of line 35 regulates the amount of exhaust gas fed into the penthouse 26. The recirculated exhaust gas serves two purposes. Firstly to provide rapid heating on start-up, to fuel mixture in passages 30 and 32 by way of the jacketing enclosures. This serves to improve the fuel mixture condition. Secondly, recirculation provides for improved exhaust emmission by reducing the proportion of nitrogen oxides in the exhaust.

I claim:

1. An internal combustion engine incorporating a plurality of carburetters mounted on the engine by way of a common structural member having a primary duct for each carburetter to allow the passage of fuel/air mixture from a carburetter to the engine and a secondary duct for liquid through the member characterised by the provision of a third duct in the member in the vicinity of, and defining a path in heat exchange relationship with, the primary duct; a pipe linking the third duct upstream of the heat exchange path to an exhaust manifold of the engine; and a passage downstream of the heat exchange path linking the third duct to the primary duct at a region in the primary duct which is downstream of the heat exchange path.

2. An internal combustion engine as claimed in claim 1 wherein an exhaust gas recirculating valve is provided in the pipe linking the third duct to the exhaust manifold.

3. An internal combustion engine as claimed in claim 1 wherein the engine has two banks of cylinders with an even number of cylinders in each bank and two carburetters; one carburetter feeding by way of its primary duct, half the cylinders in each bank; the remaining carburetter feeding by way of its primary duct the remaining cylinders in each bank.

4. An internal combustion engine as claimed in claim 1 wherein all the primary ducts are linked by a pressure balancing duct.

5. An internal combustion engine as claimed in claim 1 wherein the carburetters are of the constant depression controllable jet automatic variable choke type.

* * * * *